Oct. 27, 1953     W. F. BORGERD     2,656,685
OVERLOAD LIMITING DEVICE
Filed March 10, 1951     2 Sheets-Sheet 1

Inventor:
William F. Borgerd
Paul O. Pippel
Atty.

Oct. 27, 1953      W. F. BORGERD      2,656,685
OVERLOAD LIMITING DEVICE
Filed March 10, 1951      2 Sheets-Sheet 2
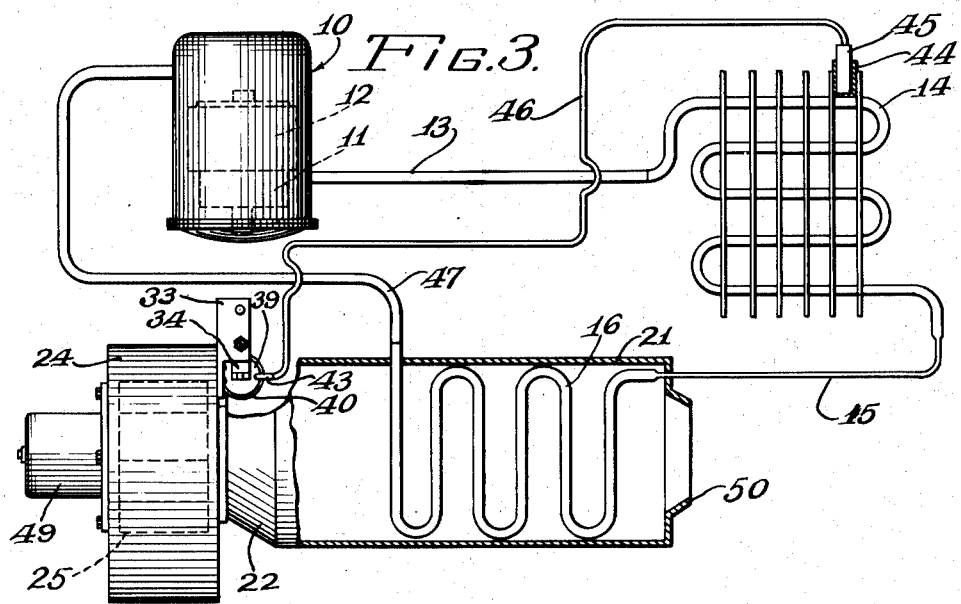
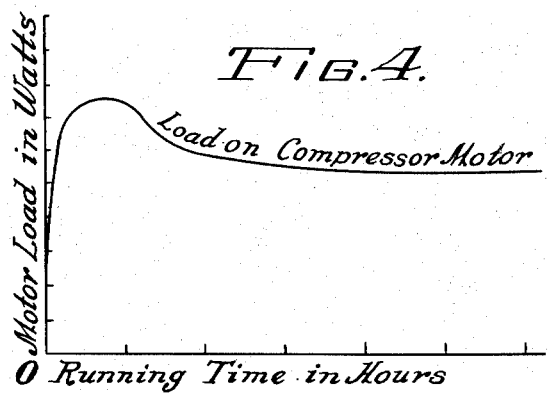
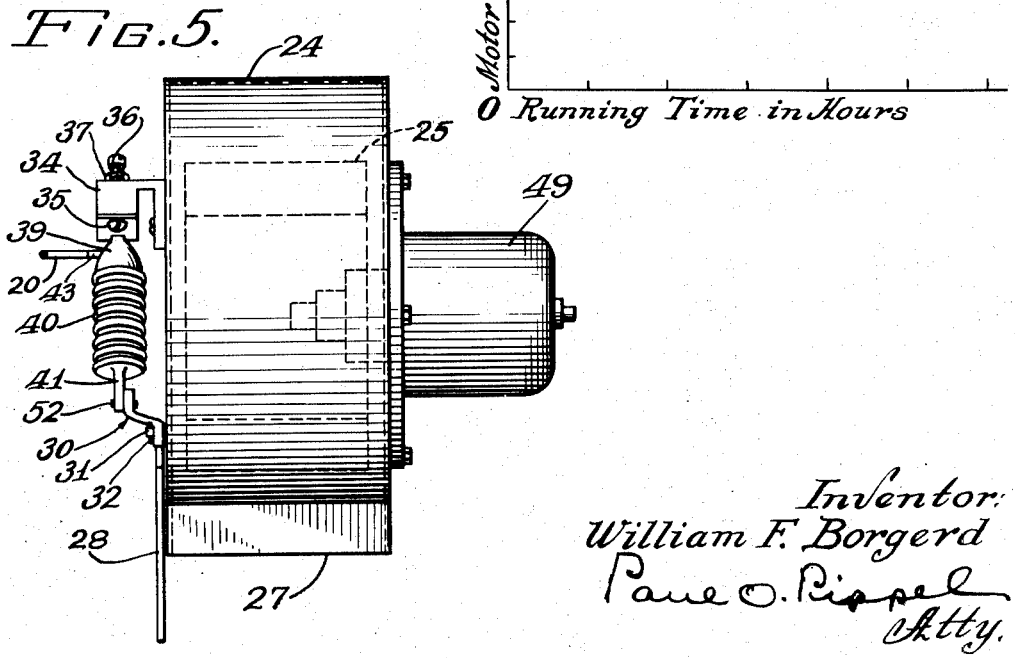
Inventor:
William F. Borgerd Patented Oct. 27, 1953

2,656,685

UNITED STATES PATENT OFFICE 2,656,685

OVERLOAD LIMITING DEVICE

William F. Borgerd, Evansville, Ind., assignor to International Harvester Company, a corporation of New Jersey Application March 10, 1951, Serial No. 214,991

3 Claims. (Cl. 62—3)

1

This invention relates to overload limiting devices and more particularly to a device for limiting the load on the driving motor of a refrigeration system.

During overload conditions or pull-down periods, the compressor motor of a refrigeration system is subjected to a much greater load than during normal operating conditions. This is particularly true of a refrigeration system provided with a capillary tube. As the temperature or volume of air coming into contact with the evaporator is increased, both the temperature and pressure of the refrigerant in the evaporator will be increased. This causes a greater resistance to the flow of refrigerant from the capillary tube so that the compressor must build up a higher pressure before the refrigerant will be forced through the capillary tube. In order to drive the compressor, the output by the compressor motor must be increased which results in a decided "hump" in the load curve for the motor. If the motor is overloaded too greatly, it may be so overheated that it will char the electrical insulation to a useless state. To avoid this it has been found necessary to provide a larger and more expensive motor than would be required solely for normal operation of the system.

It has been found that by reducing the flow of air over the evaporator during the pull-down period, the load on the motor is reduced and the "hump" in the load curve is flattened out. This permits the use of a smaller motor since the size of the motor can be determined by the normal operating load required rather than the load encountered during overload conditions.

One object of the present invention is to provide means for limiting the load on the compressor motor of a refrigeration system during overload conditions.

Another object of the invention is to provide automatic means, responsive to the pressure or temperature of a refrigeration system, for limiting the load on the compressor motor.

A further object of the invention is to provide automatically operated means for limiting the amount of air brought into heat exchange relation with an evaporator of a refrigerant system during overload conditions.

A still further object of the invention is to provide a novel damper arrangement, for controlling the flow of air over an evaporator, that is automatically operable by means responsive to the pressure or temperature of a refrigeration system.

With these and other objects in view, the invention resides in the certain new and useful combination, construction and arrangement of parts, as will be hereinafter more fully described, set forth in the appended claims, and illustrated in the accompanying drawings, in which:

Figure 1 is a diagrammatic view of a conven-

2 tional refrigeration system having the evaporator enclosed within an air duct.

Figure 3 is a diagrammatic view of a refrigeration system showing a modified form of the invention.

Figure 4 is a load curve which shows the compressor motor load as a function of the running time and serves to illustrate the "hump" heretofore discussed.

Figure 5 is a side elevational view of Figure 2.

Figure 1:
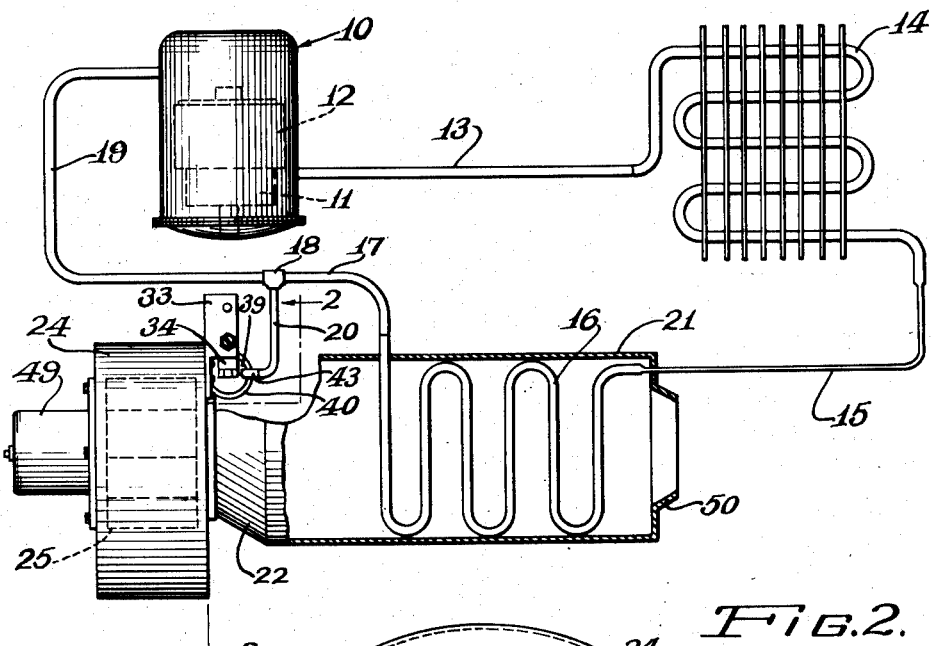

Referring now particularly to the accompanying drawings, a conventional refrigeration system is illustrated comprising a hermetically sealed compressor unit 10 having a compressor 11 and a coupled electric driving motor 12. Pipe 13 connects the outlet of compressor 11 to a suitable condenser 14, and a restrictor or capillary tube 15 connects the condenser to evaporator 16. Pipe 17, a suitable T-joint 18 and pipe 19 connect the evaporator 16 to the suction side of the compressor 11. Tube 20 connects T-joint 18 to a damper arrangement as hereinafter explained.

When the electric motor 12 is energized, it will operate compressor 11 and the refrigerant will be compressed in the conventional manner. The compressed refrigerant is discharged from the compressor through pipe 13 into condenser 14 where it is cooled and condensed by the air which contacts the finned surface of the condenser. The inner diameter of capillary tube 15 is very small so that it restricts, retards, or in effect, regulates the flow of liquid refrigerant into the evaporator 16 to the correct amount required to keep the evaporator properly supplied with refrigerant. From the evaporator, the refrigerant is returned to the compressor 11 through pipe 17, T-joint 18 and pipe 19.

In the illustration, the evaporator 16 is secured within a duct 21 which has one end 22 tapered to fit into a circular opening 23 in a blower housing 24. A suitable blower fan 25 is secured by collar 48 to shaft 26 which is rotated at a proper speed by fan motor 49. The blower outlet 27 may be joined to a duct which supplies air to a room to be cooled, whereas warmed air from the room will be brought into contact with the evaporator 16 through opening 50 of duct 21. As this air is circulated over the evaporator, it will be cooled, and by providing proper circulation the temperature within the room may be maintained at a predetermined value.

If the temperature or volume of air circulated over the evaporator 16 is increased, the temperature and pressure of the refrigerant will be raised and the compressor motor 12 will be overloaded as described heretofore. During pulldown periods, the compressor motor 12 will also be greatly overloaded. Immediately preceding the pull-down period, the refrigerant system has generally not been operating and the high side and low side pressures have leveled out so that the high side pressure is lower than during operating conditions and low side pressure is higher than during operating conditions. As the refrigerant system begins to operate under pull-down conditions, the compressor 11 pumps two to three times as much refrigerant as during normal operating conditions because of the high suction pressure. The condenser 14 begins to fill with refrigerant until the high side pressure is great enough to force refrigerant through the capillary tube 15 into the evaporator 16. Because the inner diameter of the capillary tube 15 is too small to pass the increased flow of refrigerant being pumped by the compressor 11, the refrigerant accumulates as a liquid in the condenser. This reduces the effective cooling surface of the condenser 14 which causes the high side pressure to build up until it is sufficient to force the increased flow of refrigerant through the capillary tube 15. This requires an increased output by the compressor motor 12 which results in a decided "hump" in the load curve for the motor, as illustrated in Figure 4. This is objectionable because it imposes restrictive limitations on the load the compressor motor 12 may be expected to safely carry. The present invention provides a means for effectively reducing this "hump" as will be hereinafter described.

Figure 2:
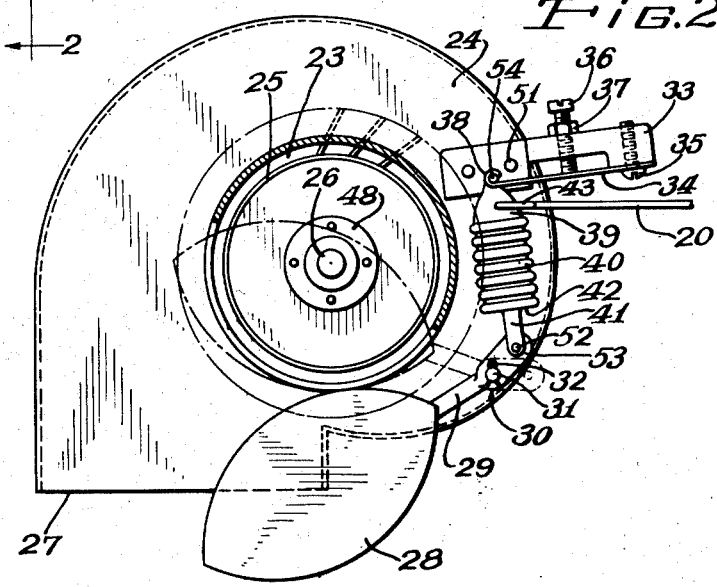
Figure 2 is an elevational view of the blower housing and damper mechanism taken on line 2—2 of Figure 1.

Referring to Figure 2 of the drawing, it may be seen that a flat elliptical damper 28 is provided for partially covering the inlet opening 23 into the center of blower fan 25. Damper 28 is secured to arm 29 of a bell-crank member 30 which is pivotally secured to stud 31. The outer end of stud 31 is provided with a cotter pin 32 for retaining the crank 30 thereon and the other end is fixedly secured to blower casing 24. A support arm 33 is secured to blower casing 24 by rivets 51 to which a flat spring 34 is secured by means of screw 35. A set screw 36 and locking nut 37 are provided for adjusting the position of the looped end 38 of spring 34. A circular shaped hollow cap member 39 is secured to the looped end 38 of spring 34 by pin 54 and a collapsible-expansible bellows 40 of suitable structure is attached to and hermetically sealed to the cap 39. The upper end of shaft 41 is attached to the movable end 42 of bellows 40 and the lower end is pivotally secured to the arm 53 of crank 30 by pin 52. Cap member 39 is provided with a tubular inlet 43 to which tube 20 connects. The other end of tube 20 is connected to T-joint 18 so that the interior of bellows 40 will be subjected to the low side or suction pressure of the refrigeration system.

Spring 34 is adjusted by adjusting screw 36 so that when the refrigeration system is operating under normal load conditions, the pressure in bellows 40 is such that the damper 28 is held in the open position as shown by solid lines in Figure 2. In this position the damper 28 does not restrict opening 23 and air is permitted to flow freely therethrough. If overload conditions are encountered, the low side pressure and temperature will increase for the reasons stated above. This will produce a corresponding increase of pressure within bellows 40 and end 42 will be forced outwardly. Shaft 41 will force crank 30 about stud 31 and damper 28 will be moved to closed position as shown by the dotted lines in Figure 2. As the opening 23 is restricted by damper 28, the flow of air over evaporator 16 will be decreased and the pressure and temperature of the low side will be quickly lowered to normal values. As soon as the pressure in the evaporator begins to drop, the bellows will begin to contract proportionally thereto and damper 28 will be moved from obstructing the opening 23 until a normal pressure is reached, at which time the damper will have been moved back to open position. This permits the refrigeration system to continue normal operation. In this manner, the load on the motor will be leveled out so that there will be no appreciable variation in the load curve and the "hump" will be eliminated during pull-down periods and overload periods.

Since both the high side pressure and low side pressure are increased during overload conditions, it is to be understood that the bellows 42 could be connected to the high side of the refrigeration system. By proper calibration, the damper 28 would then be moved to obstruct opening 23 as the high side pressure increased in the same manner as explained above when the low side pressure increased.

In Figure 3 a modified form of the invention is shown in which the structure of the refrigeration system, duct system and damper arrangement is similar to that shown in Figures 1 and 2 and like parts carry the same reference numerals. The modified structure differs in that the bellows 42 is responsive to the temperature rise of a portion of the refrigeration system. The T-joint 18 is eliminated and tube 47 connects the evaporator 16 to the suction side of the compressor unit 10. A circular shaped well 44 is provided in condenser 14 in which a thermostatic bulb 45 is secured. A small diametered tube 46 connects bulb 45 to the inlet 43 of cap member 39 and the bulb 45, tube 46 and bellows 40 are filled with a suitable contractible-expansible substance.

The operation of this form of the invention is similar to that explained above except that the bellows 40 will move in response to the temperature of the condenser 14. As the refrigeration system is subjected to overload conditions, the temperature and pressure of the high side will begin to rise as previously examined, and the temperature of the condenser 14 will be raised. The bulb 45 is secured in heat exchange relation with the condenser 14 so that the temperature of the expansible-contractable substance therein will be raised as the condenser temperature is raised. This substance begins to expand and will cause the bellows 40 to expand which moves the damper 28 toward closed position. Spring 34 is adjusted by adjusting screw 36 so that when the refrigeration system is operating under normal conditions, the pressure in bellows 40 is such that the damper 28 is held in open position. When overload conditions are encountered, the bellows 40 will move the damper 28 to closed position which will restrict the flow of air over evaporator 16 and prevent overloading of the motor 12. When the temperature of the condenser 14 returns to a normal value, the pressure within bellows 40 will decrease and damper 28 will be returned to open position.

By providing a refrigeration system with the modified structure, it will not be necessary to break into the refrigeration system in order to connect the bellows 40, which is a desirable feature for hermetically sealed refrigeration systems. The bulb 45 is illustrated as being secured adjacent a portion of the condenser 14, but it is to be understood that the damper 28 would be operated in the same manner if the bulb were attached to some other member of the refrigeration system.

From the foregoing it will be readily apparent that novel means has been provided for limiting the load on the compressor motor so that the load curve for the motor will be substantially constant. The damper arrangement is simple in design and the automatic means for operating the damper is accurately responsive to changing load conditions. By providing a refrigeration system with the present invention, a smaller compressor motor may be utilized since the size of the motor is determined by the normal operating load rather than the load encountered during overload or pull-down periods.

Various changes and modifications may be made without departing from the spirit of the invention, and all such changes are contemplated as may come within the scope of the claims.

What is claimed is:

1. In a refrigeration system having an evaporator disposed within a duct system and having a centrifugal type fan for moving air over said evaporator through said duct system, means for preventing overload of the motor-compressor unit of said refrigeration system comprising an elliptical damper, a bell-crank, a bellows, a thermally sensitive element, and biasing means, said bell-crank formed to be pivotally mountable to one side of the fan housing, said elliptical damper mounted to one arm of said bell-crank so that said bell-crank is pivotable on said fan housing to move said elliptical damper over a portion of the inlet hole of the fan housing, said bellows pivotally connected at one end thereof to the other arm of said bell-crank, the other end of said bellows being connected to said biasing means, said biasing means operable to adjust the range of movement of said bell-crank in regard to said fan housing, said thermally sensitive element connectable in thermal contact with the condenser of said refrigeration system and connected to said bellows, said thermally sensitive element operating responsive to temperature changes of said condenser to cause an expansion and contraction of said bellows, whereby the inlet to said fan housing is closable to a degree dependent upon the temperature of said condenser and the adjustment of said biasing means.

2. In a refrigeration system, an evaporator, a condenser, a motor-compressor unit, and metering means, a duct system disposed to enclose said evaporator, a centrifugal type fan mounted to said duct system and operable to move air through said duct system and over said evaporator, said centrifugal type fan having a substantially circular inlet opening, means for preventing the overload of said motor-compressor unit comprising a bell-crank pivotally mounted to the fan housing, an elliptical damper connected at one end thereof to one arm of said bell-crank, whereby said bell-crank is pivotable to move said elliptical damper over a portion of said circular inlet opening of the fan housing, a bellows, one end of said bellows pivotally connected to the other arm of said bell-crank, a bracket mounted to said fan housing, a resilient spring, one end of said resilient spring mounted to said bracket, the other end of said resilient spring connected to the other end of said bellows, said resilient spring tensioned to draw said bellows so that said bell-crank is pivoted to move said elliptical damper from said circular inlet opening, a screw threaded through said bracket and cooperating with said resilient spring so that said screw is adjustable to bias said resilient spring to different ranges of operation, a thermally sensitive element, one end of said thermally sensitive element mounted in a well in said condenser in thermal contact therewith, the other end of said thermally sensitive element connected to said bellows, said thermally sensitive element operating responsive to changes of temperature of said condenser to cause said bellows to expand and contract, whereby the amount of air entering said fan housing through said circular inlet opening is varied as a function of said condenser temperature.

3. In a refrigeration system having a motor-compressor unit, an evaporator, and a condenser, and having a duct system disposed about said evaporator, the combination of means for moving air through said duct system over said evaporator, and means for adjusting the amount of air entering said means for moving air to prevent any overload of said motor-compressor unit, said first means comprising a centrifugal type fan having a substantially circular inlet opening therethrough, said centrifugal type fan connected to said duct system so that said fan is operable to draw air into said circular inlet opening and to force said air through said duct system, said second means comprising a bell-crank pivotally mounted to the centrifugal type fan housing, an elliptical damper connected to one arm of said bell-crank, whereby said bell-crank is pivotable to move said elliptical damper over a portion of said circular inlet opening, a bellows, one end of said bellows pivotally mounted to the other arm of said bell-crank, a bracket mounted to said fan housing, a resilient spring, one end of said resilient spring mounted to said bracket, the other end of said resilient spring connected to the other end of said bellows, said resilient spring biased to cause said bellows to pivot said bell-crank to move said elliptical damper from said portion of said circular inlet opening, a set screw threaded through said bracket and positioned to cooperate with said resilient spring whereby said set screw is movable to bias said resilient spring to different ranges of operation, a thermally sensitive element, one end of said thermally sensitive element connected to said bellows, the other end of said thermally sensitive element positionable in thermal contact with said condenser, said thermally sensitive element operating responsive to changes in temperature of said condenser to cause said bellows to expand and contract, whereby the amount of air entering said circular inlet opening is dependent upon the temperature of said condenser.

WILLIAM F. BORGERD.

References Cited in the file of this patent

UNITED STATES PATENTS

| Number | Name | Date |
|---|---|---|
| 2,019,091 | Philipp | Oct. 29, 1935 |
| 2,168,157 | Crago | Aug. 1, 1939 |
| 2,171,239 | Gygax | Aug. 29, 1939 |
| 2,200,477 | Newton | May 14, 1940 |
| 2,236,190 | Wolfert | Mar. 25, 1941 |
| 2,247,449 | Neeson | July 1, 1941 |
| 2,304,999 | Gonzalez | Dec. 15, 1942 |
| 2,477,351 | Spofford | July 26, 1949 |